United States Patent Office 3,093,027
Patented June 11, 1963

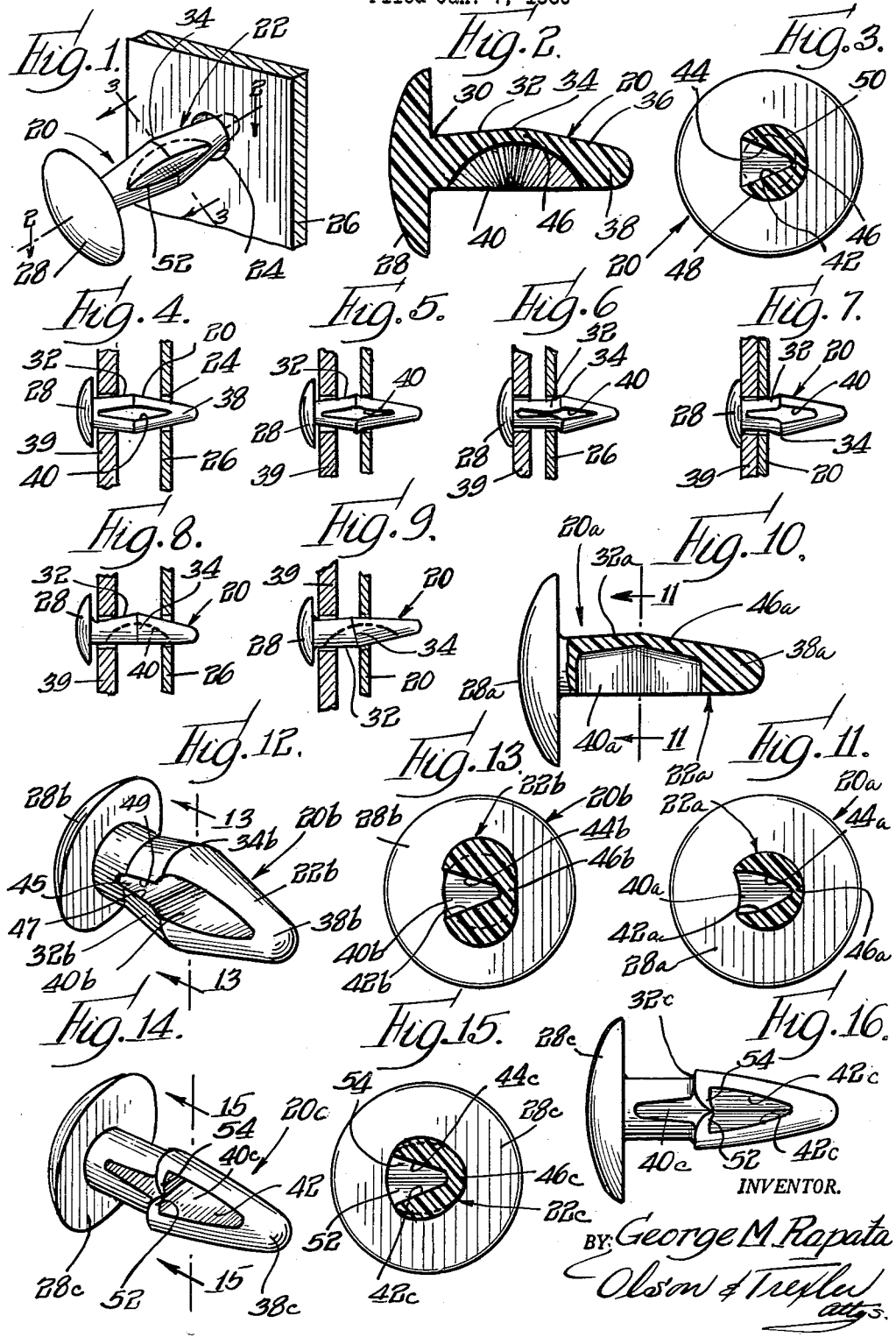

3,093,027
PLASTIC DRIVE FASTENER HAVING A RADIALLY COLLAPSIBLE SHOULDER
George M. Rapata, Park Ridge, Ill., assignor to Illinois Tool Works Inc., a corporation of Delaware
Filed Jan. 7, 1960, Ser. No. 993
5 Claims. (Cl. 85—5)

The present invention relates to a novel fastener, and more particularly to a novel one-piece fastener adapted to be driven into an apertured workpiece.

An important object of the present invention is to provide a novel one-piece plastic fastener having a shank insertable into a workpiece aperture and presenting workpiece engageable shoulder means and constructed so as to facilitate easy application thereof to the workpiece and for subsequently effectively and securely resisting unauthorized or accidental withdrawal from the workpiece.

A more specific object of the present invention is to provide a novel fastener of the above described type having a shank portion which is constructed so as to promote radial collapsing thereof during application to a workpiece aperture so that the fastener may be easily driven or pressed into the workpiece, which shank portion is also constructed so as to provide radially and axially directed forces for urging the shank portion into interengagement with the workpiece for resisting withdrawal of the shank portion from the workpiece in an improved manner.

Still another specific object of the present invention is to provide a novel fastener of the above described type which is constructed so that the fastener may be made in relatively small sizes as well as larger sizes while still retaining improved strength and holding power.

Other objects and advantages of the present invention will become apparent from the following description and the accompanying drawings wherein:

FIG. 1 is a perspective view showing a fastener incorporating features of the present invention partially assembled with an apertured workpiece;

FIG. 2 is a sectional view taken along line 2—2 in FIG. 1;

FIG. 3 is a sectional view taken along line 3—3 in FIG. 1;

FIGS. 4 through 7 are similar partial sectional view on a reduced scale showing successive steps during the assembly of the fastener with a work structure;

FIGS. 8 and 9 are respectively similar to FIGS. 4 and 5 but show the fastener turned 90 degrees from the position shown in FIGS. 4 and 5;

FIG. 10 is a partial sectional view showing a fastener employing a slightly modified form of the present invention;

FIG. 11 is a sectional view taken along line 11—11 in FIG. 10;

FIG. 12 is a perspective view showing another modified form of the present invention;

FIG. 3 is a sectional view taken along line 13—13 in FIG. 12;

FIG. 14 is a perspective view showing a further modified form of the present invention;

FIG. 15 is a sectional view taken along line 15—15 in FIG. 14; and

FIG. 16 is a side elevational view of the device shown in FIG. 14.

Referring now more specifically to the drawings wherein like parts are designated by the same numerals throughout the various figures, a fastener 20 incorporating features of the present invention is shown in FIGS. 1–9. The fastener is formed in one piece from any suitable tough resilient plastic material such, for example, as nylon. The fastener is provided with an axially extending shank portion 22 adapted to be inserted through an aperture 24 in a work piece or panel 26. A radially projecting head portion 28 is integrally formed with the trailing end of the shank portion 22 for overlying the outer surface of a work structure when the fastener is assembled.

In this embodiment the shank portion has a generally circular peripheral surface as indicated in FIGS. 1 and 3. The diameter of the shank portion at a junction 30 with the head portion 28 is less than the diameter of the work piece aperture 24. However, the peripheral surface of the shank portion flares outwardly from the junction 30 to provide peripheral shoulder means 32 projecting laterally outwardly and facing at least partially toward the head portion 28. The shoulder means has a maximum diameter at the area indicated by the numeral 34, which diameter is greater than the diameter of the work piece aperture 24 so that when the fastener is applied to the work piece, the shoulder means serves to engage behind the work piece and resist withdrawal of the fastener from the aperture. The shank portion also includes an entering end section 36 which tapers or progressively decreases in diameter from the area 34 and which terminates in a solid tip 38. The solid tip 38 facilitates insertion of the fastener through a mat 39 of insulating material or any similar part which is to be secured in association with the work piece 26 as shown in FIGS. 4–9. The reduced diameter solid and partially pointed tip 38 also serves to facilitate initial entry of the shank portion into the aperture 24 in the work piece.

In accordance with the feature of the present invention, the shank portion 22 is provided with slot means 40 which extends from the tip portion 38 and traverses the shoulder means 32 and terminates adjacent the junction 30 with the head portion 28 leaving a circumferentially continuous uninterrupted shank portion between the adjacent end of the slot and the head. It is to be noted that the slot 40 is defined by internal surfaces 42 and 44 diverging from a thin rib portion 46 of the shank extending along a closed side of the shank opposite from the open side of the slot. In other words, the slot 40 has a generally V-shaped transverse cross section so that the shank portion is, in effect, provided by relatively thick axially extending elements 48 and 50 hinged together by the rib portion 46 as shown best in FIG. 3. The thickness of the rib portion 46 between the bottom of the slot and the opposed outer surface of the shank at the shoulder 34 and at least adjacent thereto in directions toward the head and toward the tip is of a minimum thickness relative to the cross-section of adjacent portions of the shank elements on opposite sides of the rib portion. This serves to concentrate flexing of the shoulder along the rib portion when the shank elements are moved toward and away from one another. Thus when the shank portion is inserted into the work piece aperture in the manner described in detail below, the shank elements 48 and 50 fold together around the resilient hinge means provided by the rib 46 for radially collapsing the shoulder means 32 sufficiently to permit entry through the work piece aperture. The gradually increasing diameter of the shank and the increasing depth of the slot cause an increase in the effective lever arm to which pressure is applied for folding the shank about the rib 46 as the shank is progressively inserted into an aperture.

It is further to be noted that the shank portion is constructed so that the side surfaces 42 and 44 of the slot intersect the peripheral surface of the shank along a generally oval line 52 as shown best in FIG. 1. Thus the maximum width of the slot is at a location coinciding with the maximum diameter of the shoulder means 32. The arrangement is such that the circumferential extent of the shank peripheral surface between the lines of intersection with the slot sides 42 and 44 and at all points along the shank is no greater than the circumferential extent of the work piece aperture 24. Thus, when the shank elements 48 and 50 are collapsed toward each other during application of the fastener to the work piece, the diameter and over-all circumferential extent of the shoulder portion 32 may be reduced to values not exceeding those of work piece aperture 24 without crushing or substantially compressing the material of the fastener so that application of the fastener is facilitated. At the same time the relatively thick shank elements 48 and 50 and the uninterrupted axially extending rib and hinge portion 46 provide the shank with strength and ruggedness so that it may be applied to the work without injury. In this connection it will be noted that, as shown in FIG. 2, the bottom edge of the slot is rounded and is formed so that its deepest point coincides with the maximum diameter of the shoulder section 32 whereby maximum strength and durability is obtained along with the desired radial collapsibility.

When assembling the fastener 20 with a work structure, it is first pressed through the mat 39 or any other article to be retained and then started into the work piece aperture 24 as shown in FIGS. 4 and 8. Then as the fastener shank is advanced into the work piece aperture, the edge of the aperture engages the tapering or cam surfaces of the entering end portion of the shank for folding the shank elements 48 and 50 around the rib portion 46 and toward each other as shown in FIGS. 5 and 9. As the shank elements 48 and 50 along the opposite sides of the slot 40 are flattened and moved toward each other, they serve as struts which tend to elongate the shank axially. Since, however, the rib portion 46 is continuous, the tendency of the shank to be elongated causes the shank to be twisted or bent around an axis extending transversely of the rib portion 46 as shown in FIG. 9. It is to be noted that this deflection of the shank portion sets up axial stresses which combine with radially directed forces biasing the shoulder means outwardly toward its normal position for urging the shoulder means into engagement with the work piece when assembly of the fastener has been completed.

Referring particularly to FIG. 6, it will be seen that as the maximum diameter portion of the shoulder means 32 passes through the work piece aperture, the shank is radially collapsed until the surfaces 42 and 44 of the slot means are in substantially abutting parallel relationship whereby the over-all circumferential extent of the shank is reduced to the circumference of the aperture. Then upon completion of the assembly as shown in FIG. 7 the resiliency of the material in the shank causes the shoulder means to be urged radially and axially against the work structure for resisting withdrawal of the shank from the work piece.

FIGS. 10 and 11 show a modified form of the present invention which is similar to the structure described above as indicated by the application of identical reference numerals with the suffix a added to corresponding elements. This embodiment differs in that the bottom edge of the slot 40a is more nearly of uniform depth and generally follows the longitudinal contour of the outer surface of the rib portion 46a. This structure minimizes the amount of stock material required for the fastener and further increases the flexibility of the fastener shank. In this form of the invention, as well as the form shown in FIG. 2, the bottom of the slot is inclined from the shoulder area of maximum depth toward the head and the tip and the opposite end surfaces of the slot intersect the peripheral surface of the shank. The edges of the slot intersecting the peripheral surface of the shank are shown in FIGS. 2 and 10 as lying in a common plane substantially parallel to the shank axis.

FIGS. 12 and 13 show a fastener 20b incorporating features of the present invention in a modified structure. This embodiment illustrates the manner in which the shank portion can be provided with an exterior configuration other than circular, and in the embodiment shown the shank portion is formed with a generally oval transverse cross section. It will be appreciated that, if desired, the shank portion could be provided with a polygonal or other cross sectional shape, and in such instances the aperture in the work piece may be formed to correspond to the shape of the fastener shank.

In this embodiment the portion 45 of the slot in the shoulder section 32b is relatively narrow so that the opposite walls of this portion of the slot may engage each other and act as pressure pads 47 and 49. These pads are spaced axially toward the head from the widest shank area 34b for acting to expand the shank when the shank is fully applied to the work. Such a slot may also be formed in a round shank.

FIGS. 14, 15 and 16 show a further modified form of the present invention which is similar to the structures described above as indicated above by the application of identical reference numerals with the suffix c added to corresponding elements. This embodiment differs in that the portion of the shank immediately adjacent the head is generally of uniform diameter throughout its length and the shoulder means 32c projects abruptly laterally or radially outwardly at the junction between the first shank portion and the entering end portion. Another feature of this embodiment is the provision of integral flexure spring-like flaps or pads 52 and 54 extending toward each other from opopsite side surfaces 42c and 44c of the slot and in the vicinity of the shoulder means 32c. These pressure pads engage each other and provide a spring force in addition to the forces described above for biasing the shoulder means into engagement with a work piece when the fastener has been assembled with the work piece.

While the preferred embodiments of the present invention have been shown and described herein, it is obvious that many structural details may be changed without departing from the spirit and scope of the appended claims. For example, the device may be provided with various special head structures. One such head structure could be formed for retaining articles such as molding strips.

The invention is hereby claimed as follows:

1. A one-piece plastic drive fastener comprising an axially elongated shank insertable into a complementary workpiece aperture having a predetermined circumference, and a radially enlarged portion at one end of the shank providing a first surface transverse to the axis of said shank for engaging one side of the margins of said workpiece surrounding said aperture, said shank including a portion of increased diameter relative to the diameter of the shank portion adjacent said first surface to provide shoulder means spaced from said first surface for engaging said workpiece and resisting withdrawal of the fastener from the workpiece when the shank has been inserted into the workpiece aperture, said shank including a tapering entering end portion extending from said shoulder means and terminating in a circumferentially continuous solid tip for facilitating application of the shank to the workpiece, said shank having laterally opening slot means therein extending from adjacent said solid tip toward said first surface to expose a circumferentially continuous uninterrupted shank portion from said slot means to said first surface, said slot means being defined by generally axially extending side surfaces positioned on opposite sides of the shank axis and a bottom wall closing said slot, said side surfaces diverging with respect to each other substantially from said bottom wall to intersections with a peripheral surface of the shank, said side surfaces joining said bottom wall closely adjacent to a plane containing the axis of said shank whereby said slot bottom provides an axially extending resilient hinge rib integrally joining axially extending margins of elements of the shank separated by said slot means and with the thickness of the shank material which forms the hinge rib between the bottom of the slot means and the opposed outer surface of the shank at said shoulder means and at least adjacent thereto in a direction both toward said first surface and said tip being of a minimum thickness relative to the cross-section of adjacent portions of the shank elements on opposite sides of said rib to concentrate flexing of the shoulder means along the rib as the adjacent shank elements are moved toward and away from one another, the intersections of said side surfaces with said peripheral surface converging in an axial direction from said shoulder means both toward said first surface and said tip until they join to define an opening which has a maximum width in the vicinity of said shoulder means, and which diminishes in width both toward said first surface and said tip, said slot having a maximum depth in the vicinity of said shoulder means substantially greater than one-half of the maximum shank diameter, said bottom inclining from said point of maximum depth toward said first surface and said tip and the opposite end surfaces of the slot means intersecting said peripheral surface, substantially all transverse peripheral surface portions of said shank which are insertable into said workpiece aperture having a circumference, exclusive of said slot surfaces, not in excess of the circumference of the workpiece aperture.

2. A one-piece plastic drive fastener as claimed in claim 1, wherein said shank has a generally circular overall transverse cross-section, and said shoulder means comprises an exterior shank surface portion flaring axially and laterally outwardly from said head.

3. A one-piece plastic drive fastener as claimed in claim 1, which includes integral spring means extending between said side surfaces of the slot means in the vicinity of said shoulder means for aiding in resiliently urging the shoulder means against a workpiece when the fastener is assembled with the workpiece.

4. A one-piece plastic drive fastener as claimed in claim 1, wherein the intersections of said side surfaces with said peripheral surface and the shank surface portions adjacent each end of said slot means lying in a common plane parallel to the shank axis.

5. A one-piece plastic drive fastener comprising an axially elongated shank insertable into a complementary workpiece aperture having a predetermined circumference, and a radially enlarged portion at one end of the shank providing a first surface transverse to the axis of said shank for engaging one side of the margins of said workpiece surrounding said aperture, said shank including a portion of increased diameter relative to the shank portion adjacent said first surface to provide shoulder means spaced from said first surface for engaging said workpiece and resisting withdrawal of the fastener from the workpiece when the shank has been inserted into the workpiece aperture, said shank including a tapering entering end portion extending from said shoulder means and terminating in a circumferentially continuous solid tip for facilitating application of the shank to the workpiece, said shank having laterally opening slot means therein extending from adjacent said solid tip toward said first surface to expose a circumferentially continuous uninterrupted shank portion from said slot means to said first surface, said slot means being defined by generally axially extending side surfaces positioned on opposite sides of the shank axis and a bottom wall closing said slot, said side surfaces diverging with respect to each other substantially from said bottom wall to intersections with a peripheral surface of the shank, said side surfaces joining said bottom wall closely adjacent to a plane containing the axis of said shank whereby said slot bottom provides an axially extending resilient hinge rib integrally joining axially extending margins of elements of the shank separated by said slot means, the intersections of said side surfaces with said peripheral surface converging in an axial direction from said shoulder means both toward said first surface and said tip until they join to define an opening which has a maximum width adjacent said shoulder means, and which diminishes in width both toward said first surface and said tip, said slot having a maximum depth at said shoulder means substantially greater than one-half of the maximum shank diameter, said bottom inclining from said point of maximum depth toward said first surface and said tip and the opposite end surfaces of the slot means intersecting said peripheral surface, substantially all transverse peripheral surface portions of said shank which are insertable into said workpiece aperture having a circumference, exclusive of said slot surfaces, not in excess of the circumference of the workpiece aperture, the intersections of said side surfaces with said peripheral surface and the shank surface portions adjacent each end of said slot lying in a common plane parallel to the shank axis.

References Cited in the file of this patent

UNITED STATES PATENTS

| | | |
|---|---|---|
| 2,067,039 | Auer | Jan. 5, 1937 |
| 2,836,214 | Rapata | May 27, 1958 |
| 2,853,913 | Rapata | Sept. 30, 1958 |
| 2,909,857 | Rapata | Oct. 27, 1959 |

FOREIGN PATENTS

| | | |
|---|---|---|
| 286,139 | Great Britain | Mar. 1, 1928 |